United States Patent [19]

Zirm

[11] Patent Number: 5,376,007

[45] Date of Patent: Dec. 27, 1994

[54] APPARATUS AND METHOD FOR TEACHING AND LEARNING MICROSURGICAL OPERATING TECHNIQUES

[76] Inventor: Matthias Zirm, A-6020, Innsbruck, Austria

[21] Appl. No.: 810,372

[22] Filed: Dec. 19, 1991

[51] Int. Cl.⁵ ............................................. H04N 5/00
[52] U.S. Cl. .............................. 434/262; 434/307 R; 434/350
[58] Field of Search .............. 434/262, 307, 350, 322, 434/323, 434, 252, 319; 351/203, 210; 370/62; 358/85

[56] References Cited

U.S. PATENT DOCUMENTS

| | | | |
|---|---|---|---|
| 4,052,798 | 10/1977 | Tomita et al. | 434/307 X |
| 4,648,052 | 3/1987 | Friedman et al. | 351/210 X |
| 4,713,686 | 12/1987 | Ozaki et al. | 434/252 X |
| 4,730,218 | 3/1988 | Goodrich | 434/370 X |
| 4,785,472 | 11/1988 | Shapiro | 434/307 X |
| 5,014,267 | 5/1991 | Tompkins et al. | 370/62 |

Primary Examiner—Richard J. Apley
Assistant Examiner—Glenn E. Richman
Attorney, Agent, or Firm—Paul H. Gallagher

[57] ABSTRACT

A method for teaching microsurgical operation techniques, the teacher demonstrating the operation technique to be taught on an operation model, whereby the operation field is observed by the teacher through a microscope and recorded by at least one video camera, whose signals are presented by a monitor or by a video projector on a large screen projector. For instructing several students, a multiple student-station laboratory is provided whereby for each student a like operation model with a microscope, and at least one video camera are arranged, and the signals generated from the video camera are transmitted to a distributor, which presents the signals of each video camera from each student station on a multiple field monitor, which is observed by the teacher and whereby there is furthermore means for oral communication between the student and the teacher.

8 Claims, 4 Drawing Sheets

APPARATUS AND METHOD FOR TEACHING AND LEARNING MICROSURGICAL OPERATING TECHNIQUES

FIELD OF THE INVENTION

The invention relates to the general field of surgical operations, including specifically, for example, operations on the human eye.

SUMMARY OF THE INVENTION

A broad object of the invention is to provide a technique for overcoming certain difficulties in such operations. Because of the limited dimensions of the zone of the operation, i.e., in the eye, it is possible for either the teacher, or the student alone, to conduct the operation, and the operation is displayed on a monitor by means of a video camera. In either of these cases, precise instruction to the student is difficult if not impossible, because in the operation, the student must, at times, operate with his instruments at positions, relative to the subject eye, that are not visible to him, and thus he cannot directly observe the results of his operation. Each student is at a station at which an operation model, i.e., of the eye, is on an operating table, and there conducts the operation, on the eye, in the teaching and learning procedure. In association therewith, the teacher has at his station an operation model, and the operation that he conducts is transmitted by the video camera to the projection screen.

A great disadvantage of methods heretofore known, is that there was no direct audio contact between the teacher and the student, and the student can only watch on the projection screen, the result of the operation performed by the teacher, and therefore it is not completely possible for the student to be able to compare his own operation result with that of the teacher.

A great advantage of the present apparatus is that the teacher can communicate directly with the student and call his attention to errors in the student's operation technique, while the operation is proceeding.

Another broad object is to provide a method whereby better instruction supervision can be provided in such operation techniques.

Another advantage is that each student is provided with an operation model, similar to that provided to the teacher, and with a microscope and at least one video camera, and means is provided for transmitting the signals from the students selectively to corresponding fields in a multiple-field monitor.

An additional advantage is that the apparatus and method includes a multiple-station system whereby a teacher can simultaneously follow all of the operations conducted by the students, since the latter are projected on a multiple-field monitor.

Still another advantage is audio contact between the teacher and the students, such as by a headphone-microphone combination, and a distributor by means of which the teacher can selectively contact each individual student.

A further advantage of the feature just referred to, is that the teacher can selectively communicate with each student's station, where the operation technique, of each individual student, can be followed on the multiple-field monitor, and selectively make audio contact with each student, and direct him in the step by step performance of the student's operation.

The invention includes the feature of a High Communication Wetlab, which includes the advantage of audio-visual connection between the individual students and the teacher. In such an arrangement, the teacher's operation is projected on a large screen, for observation by the students, and the students have audio contact with the teacher, providing in a sense a language laboratory. An advantage thereof is that the students can hear the teacher in their own headphones without background noise, and they can speak with the teacher over their own individual microphones. The teacher observes in his own multiple-field monitor, all of the eye specimens of the students, and can visually oversee each individual student in a step by step manner. By the simple means of pushing a button, for example, the operation results of a desired student can be alone shown on the monitor. In this instance also there is isolated acoustical connection between the teacher and the student, enabling an intensive and totally anonymous instruction to be given by the teacher to the respective student, and therefore the other students are not disturbed by instructions given to an individual student.

Another advantage of the invention is that more than one video camera can be utilized in connection with an individual student's station, which portray different parts or phases, of the operation zone, from different sides or from different angles. In an eye operation, it occurs, at least on occasion, that the student cannot directly follow the progress of the operation from a single viewpoint, that is, a portion of it may be hidden from view. Thus such additional video camera can pick up that portion of the operation that is not directly visible to the student, whereby it can be projected onto an instruction monitor. Thus the teacher can not only observe the portion of the operation that can be observed by the student, but also others that may be hidden from the student's view.

The signals from the different video cameras may be projected variously as desired, such as on more than one video recorder or monitor.

In the feature just above referred to, a further advantage is that that portion of the operation that cannot be directly viewed by the student, may be projected on a monitor in position for the student himself to observe, during the operation.

A further advantage is that in addition to the signals from a plurality of cameras being projected and observed, also measurements occurring at the operation zone can be utilized or observed. For example, pressure measurements, or geometrical measurements, of the operation zone can be observed and dealt with, to avoid possibly harmful operation techniques or steps. The signals from such measurements are digitalized and sent over a multiplexer to a computer, which then may be utilized for summing up the entire operation, and providing a test certificate.

A resulting advantage is that such measurement results can be contrasted with the video pictures of the operation and enable observation of the measuring method.

In such eye surgery operation, the operation may be performed on an artificial head, in the eye region of which an artificial eye or an animal eye may be set, on which the operation is formed and observed. At each student station, preferably the video camera is operably connected with a microscope through which the operation is observed by the video camera.

Another great advantage is that a teacher's station and a student's station may be positioned at great spatial distances such for example as the teacher being located in the U.S.A., and a student located in Europe. In such a case the video and audio signals produced at the operation's station are transmitted by means of wireless means, such for example as by satellite transmission. At the student's station there would be of course located the desired instrumentalities including the monitor and the projection screen. This transmission of signals is also of course 2-way, the signals from the student's station being transmitted to the teacher's station. As used herein, the term intercontinental is to be interpreted as of great distance, such for example as from the middle of one continent to the middle of another continent.

The results and advantages of the invention result not only from the scope of individual claims, but rather the scope of all of the claims taken together. The features and characteristics set out in all portions of the application are essential to the invention, insofar as they are new in the field.

The apparatus of the invention, and corresponding steps in the method, may be of various forms, as represented in the different forms of the drawings.

DETAILED DESCRIPTION

Figure 1:
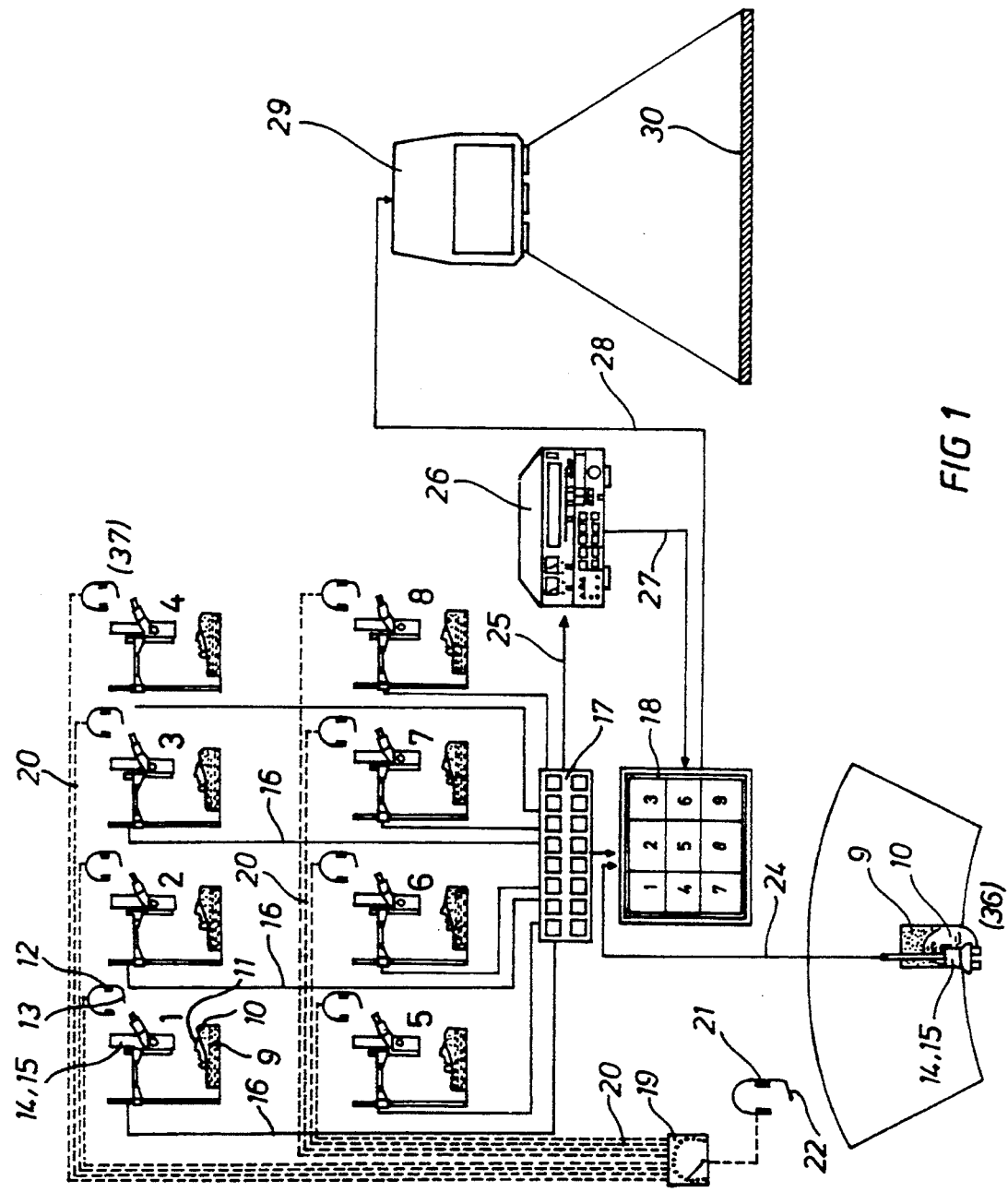
FIG. 1 is a diagrammatic view of a form of apparatus for carrying out the invention.

FIG. 1 shows in diagrammatic arrangement, eight student operation stations, numbered 1-8. Such stations need not be limited to eight, but there may be sixteen, for example. At each of the student stations, there is a microscope 14 and a video camera 15 operably connected therewith. A student, at a position indicated at 37 (top middle) looks through the microscope 14 at the operation model 10 lying on an operating table 9, the model simulating an artificial face, in whose eye socket an animal eye 11 or artificial eye is placed.

The signals developed by the video camera 15 in operation are conducted by means of conductors 16 to a video distributor 17, of which the output signals are relayed to a multiple-field monitor 18. In this manner the video pictures of all eight or sixteen operation stations 1-8 can be displayed on the multiple-field monitor 18.

The teacher may be positioned at a station indicated at 36 (bottom), where a similar operation model 10 is positioned, and at this station, is a video camera 15 operably connected with a microscope 14. In this case the operation object or subject 11, is an eye as referred to above.

An important feature of the arrangement is that at each student station there is provided a headphone-microphone combination, including a headphone 12 (FIG. 2 top left) and a microphone 13. Conductors 20 are provided leading from the student stations to an audio distributor 19 (lower left), the output of which leads to the headphone-microphone combination 21, 22 (lower, left) of the teacher at the station 36.

The teacher can, by means of dialing or manipulating the audio distributor 19, establish audio communication with each student as desired.

The signals transmitted to the video distributor 17 are transmitted therefrom, by means of a conductor 25 to a video recorder 26, of which the output signals can be displayed, by means of conductors 27, on the multiple-field monitor 18.

In order to transmit the results of the operation by the teacher to render them available to the students, the microphone video camera combination 14, 15 (FIG. 1 bottom left) is provided and is connected by means of a conductor 24, with the multiple-field monitor 18, so that the results of the operation by the teacher can be displayed on the monitor. Additionally the operation results of the teacher, or any of the students, can, by means of a conductor 28 be displayed on a video projection 29, which portrays the video picture on a large screen projector 30.

Figure 2:
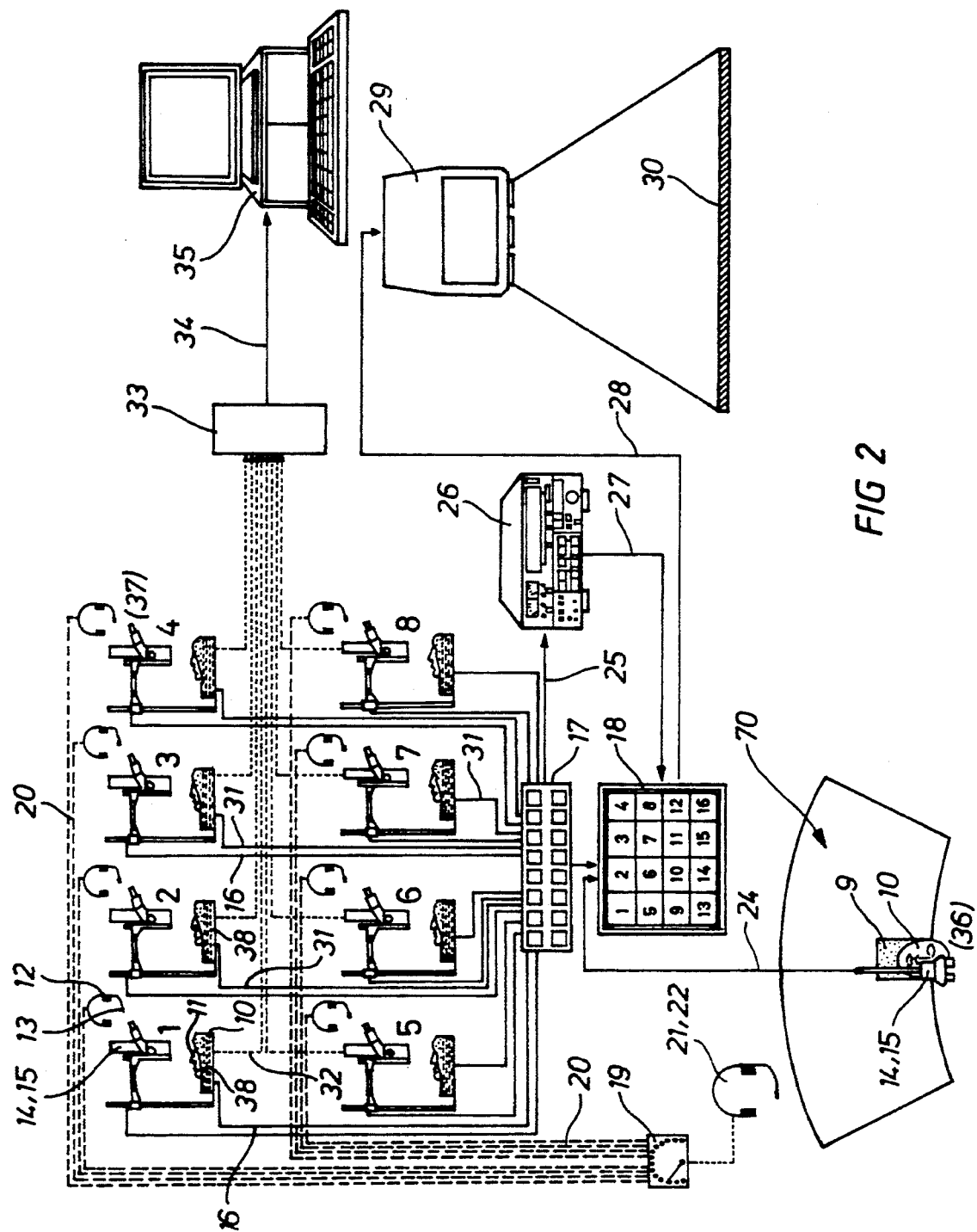
FIG. 2 is similar to FIG. 1, but with additional component.

Reference is made to FIG. 2 which includes the arrangement of FIG. 1, where the same parts are indicated by the same reference numerals, and additional components. In FIG. 2 at each student station, as represented in stations 1 and 2, a video camera 38 is provided, which views the operation object 11 from below, that is, the side opposite that from which the student observes the model. The signals from the video camera 38 are similarly directed, by means of conductor 31, to the video distributor 17 and can also be presented on the multiple-field monitor 18.

It is also possible to obtain additional measurement results from the operation step such as for example the results of a pressure measurement from the operation zone, in order to determine any possible damage to the tissue.

The conductors 32 (FIG. 2 upper left) of this measuring device lead to a measurement data accumulation component 33, which for example is constituted by a digital multiplexer, and from the exit of the latter, a conductor 34 leads to a computer 35, which collects and computes the data in digital form.

As a result of the foregoing, the corresponding measurement findings at the conclusion of the operation can be coordinated with the video pictures of each operation, utilizing a synchronized timer as a basis.

From the foregoing it is also observed that a great advantage of the operation techniques disclosed result in great benefits in teaching technique, since the teacher at the station 36, by means of depressing a button in the video distributor 17 and a button in the audio distributor 19, can at any time establish oral communication between the teacher and each individual student, as well as to display the video picture of the operation field of this student alone on the multiple-field monitor 18. It is therefore possible, by means of this invention, to conduct an intense and undistracted instruction to several students at one time.

It is also obvious that the student operation stations 1-8 can be located at a great distance from the location of the teacher and from the audio-video devices. For example, it is possible for an operation station of the student to be located in Europe while the teacher with the coordinated audio-visual devices is located in America.

Figure 3:
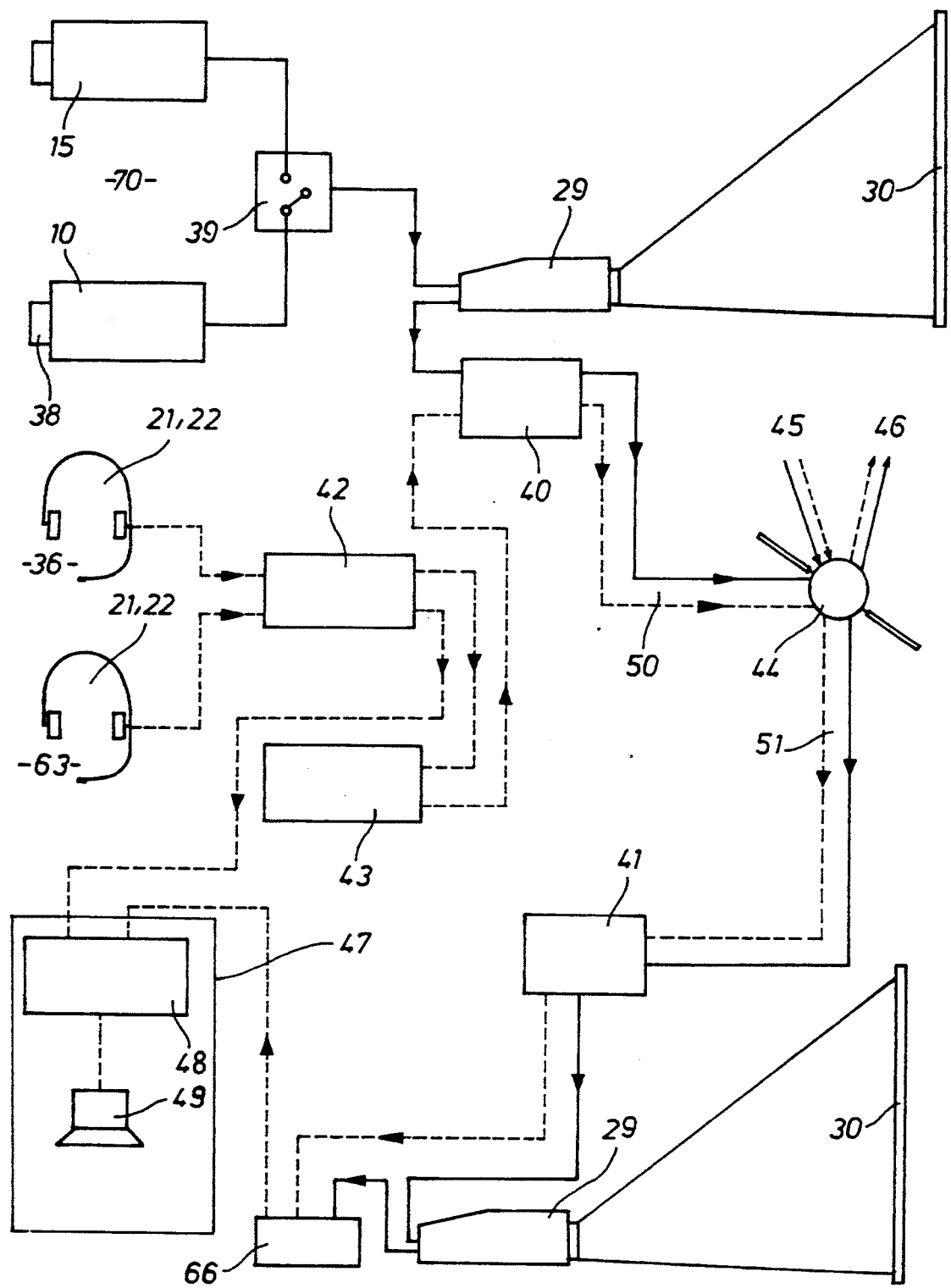
FIG. 3 is a diagram of components at a teacher's station.

Referring to FIG. 3, the teacher's station 70 (top left) has a first microscope and a video camera 15 operably connected thereto, whereby the teacher can observe, and display as a video picture, the operation technique performed by him.

If necessary, presented at the disposal of the teacher at 36, is an additional operation model 10, at which another video camera 38 is arranged. The type and construction of the teacher station 70 (FIG. 3) is as described above in connection with FIGS. 1 and 2.

The signals of both video cameras 15, 38 can be selectively directed by means of a 2-way switch 39 and fed to a video projector 29, which directly presents the operation conducted by the teacher in the teacher station or laboratory, on a large screen projector 30.

Alternatively, or supplemental thereto, the video signals from the teacher station 70 are switched and transmitted by means of a code transformer 40 by means of conductors 50 where they are transmitted by means of a transmitting component 46 and an antenna 44 over distances that may be great, to the student station or laboratory.

The audio signals from the teacher at station 36 are transmitted, by means of an audio mixer 42 (FIG. 3 middle) on one side to an audio amplifier 48 which triggers a loudspeaker 49, for example, in a conference room 47 (lower right), and on the other side the audio signals are transmitted over an audio amplifier 43 to the code transformer 40, and similarly directed by means of the connections 50 to the transmitting component 46.

At the teacher station 36 (FIG. 3 middle left) an assistant teacher can be located, for whom a headphone-microphone arrangement 21, 22 is arranged, whereby audio signals of the assistant teacher at 63 can be played back or transmitted over the transmitting component 46 to the student station or laboratory.

Figure 4:
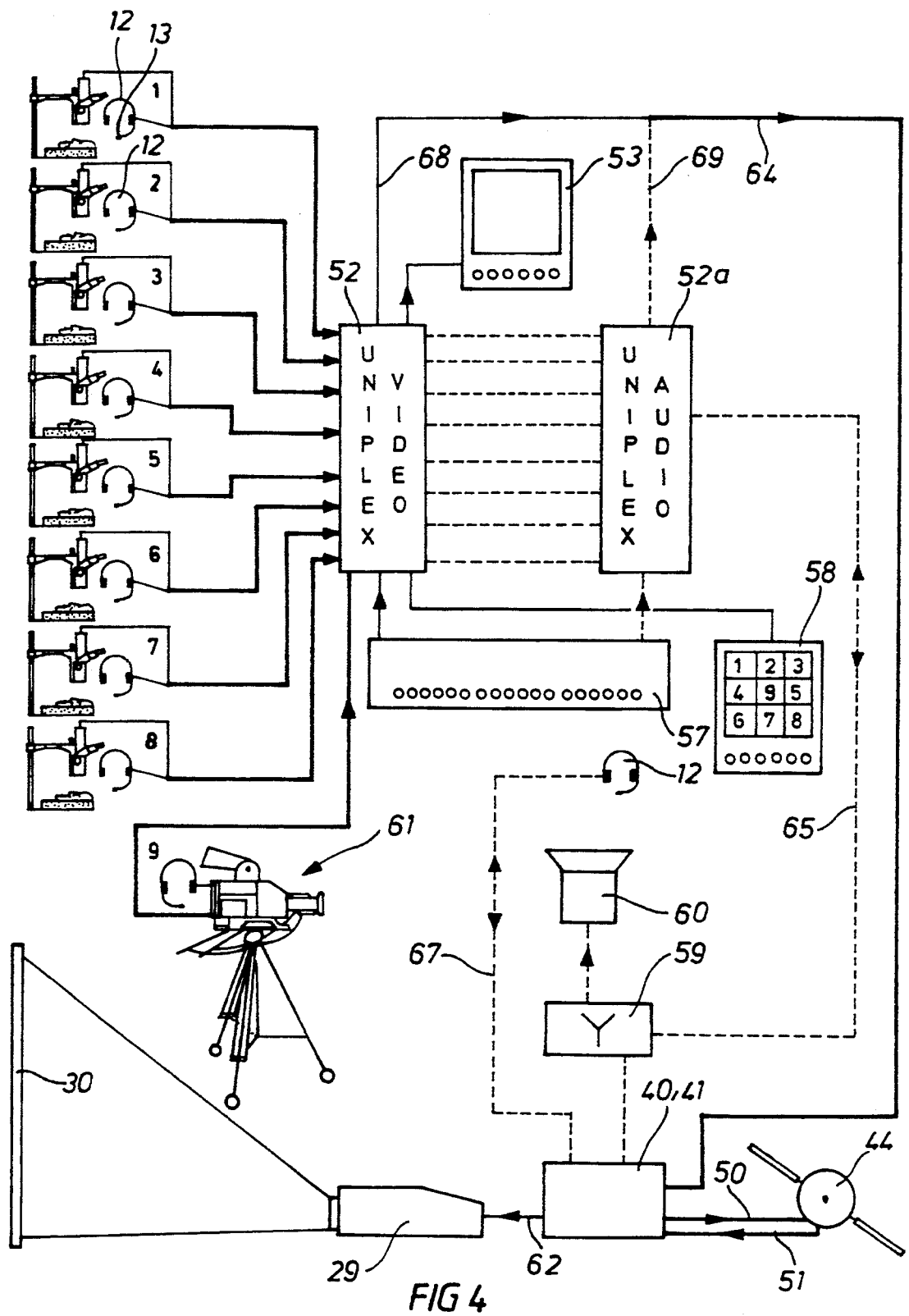
FIG. 4 is a diagram of components at a student's laboratory.

Conversely, all video and audio signals from the student stations are transmitted to the teacher station, as is referred to again more fully in connection with FIG. 4.

The video signals generated in the student station are received by the component 45 from the antenna 44 and directed by means of the conductors 51 to the code transformer 41.

A video recorder 66 (FIG. 3 bottom) and a video projector 29 can be connected to the code transformer 41, the projector projecting, on the large screen 30, the respective video and audio signals, selected by the operator, in the student station.

Thereby the teacher at station 36 and the assistant teacher at station 63 can observe both large projectors 30 or corresponding monitors, in order thus to constantly compare the operation result of the master operation with the operation result of a selected student in any of the student's stations 1–8.

FIG. 4 diagrammatically shows an arrangement for subsequently presenting the results of the student operations in the student stations. The disclosure of the student stations in FIGS. 1 and 2 are incorporated in the arrangement of FIG. 4, by reference. All of the components of FIGS. 1 and 2 may be referred to for explanation of the apparatus of FIGS. 3 and 4, even though not completely referred to in detail therein. It is therefore possible, for example, to equip the student station according to FIG. 4 with additional measuring instruments in order to be better able to supervise the operation result.

In FIG. 4 the student stations are indicated at 1–8. The video signals of each student station are fed into a video 2-way switching device 52 and the audio signals are fed to an audio 2-way switching device 52a.

From a control board 57 (middle) an operator can dial, and connect together by means of the conductors 68, 69, and lead to the code transformer 40, 41 (bottom) by means of a conductor 64, the video and audio signals of any selected student's station. At the exit of the code transformer, the dialed video-audio signal is again transmitted over the conductors 50 to the antenna 44 and there transmitted (to the distant receiver).

At the video 2-way mechanism 52, a control monitor 58 is attached at the control board for the operator, so that the picture selected by him, which is sent to the teacher station, can be observed.

Similarly the operator observes the control monitor 54, which is preferably in the form a split monitor, to observe every video signal generated from each student station, 1–8.

The video and audio signals received by the antenna 44 (FIG. 3) are fed from the antenna through the conductors 51 into the code transformer 40, 41. The audio signals are transmitted over the conductor 67 to the headphone-microphone field effect transistor (FET) of the operator at the control board 57. Similarly, the audio signals are switched to a switch 59 where they are broadcast over a loudspeaker 60 to the student station.

In a similar manner, though not shown in the drawing, the audio signals generated by the teacher can effectively be transmitted over the operator-run control board 57 to the headphone 12 of a selected student.

The video signals received from the teacher station can be transmitted over the conductor 62 to the video projector 29 and presented on a large screen 30 in the student station or laboratory.

Similarly a monitor can be arranged at each student station, not illustrated, so that each student has a corresponding monitor picture of the master operation, i.e., the operation to be observed by him.

Furthermore, a studio camera 61 (FIG. 4 lower left) may be utilized, for taking pictures of selected places or locations in the student laboratory. Signals from this camera may be sent by wireless over the 2-way switching devices 52, 52a into the teacher station or laboratory.

End of Descriptive Specification

| APPARATUS AND METHOD FOR TEACHING AND LEARNING MICROSURGICAL OPERATING TECHNIQUES DRAWING LEGENDS | |
|---|---|
| 1–8 | Student Station |
| 9 | Operating table |
| 10 | Operation model |
| 11 | Operation object |
| 12 | Headphone |
| 13 | Microphone |
| 14 | Microscope |
| 15 | Video camera |
| 16 | Conductor |
| 17 | Distributor |
| 18 | Multiple field monitor |
| 19 | Distributor |
| 20 | Conductor |
| 21 | Headphone |
| 22 | Microphone |
| 24 | Conductor |
| 25 | Conductor |
| 26 | Video recorder |
| 27 | Conductor |
| 28 | Conductor |
| 29 | Video projector |
| 30 | Large screen projector |
| 31 | Conductor |
| 32 | Conductor |

APPARATUS AND METHOD FOR TEACHING AND LEARNING MICROSURGICAL OPERATING TECHNIQUES DRAWING LEGENDS

| | |
|---|---|
| 33 | Measurement data capture |
| 34 | Conductor |
| 35 | Computer |
| 36 | Teacher |
| 37 | Student |
| 38 | Video camera |
| 39 | Two-way switch |
| 40 | Code transformer |
| 41 | Code transformer |
| 42 | Tone mixer |
| 43 | Audio amplifier |
| 44 | Antenna |
| 45 | Receiving part |
| 46 | Transmitting part |
| 47 | Conference room |
| 48 | Audio amplifier |
| 49 | Loudspeaker |
| 50 | Conductors |
| 51 | Conductors |
| 52 | Video 2-way switching device |
| 52a | Audio 2-way switching device |
| 53 | Control monitor |
| 55 | Tone 2-way switching device |
| 57 | Control board |
| 58 | Control monitor |
| 59 | Switch |
| 60 | Loudspeaker |
| 61 | Studio camera |
| 62 | Conductor |
| 63 | Assistant teacher |
| 64 | Conductor |
| 65 | Conductor |
| 66 | Video recorder |
| 67 | Conductor |
| 68 | Conductor |
| 69 | Conductor |
| 70 | Teacher work place |

We claim:

1. A method of teaching microsurgical eye operation techniques comprising the steps:
   performing a microsurgical eye operation on a operational eye model by a teacher at a teacher station;
   taking video pictures with a video camera of the operation through a microscope;
   transmitting said pictures to a video screen viewable by a plurality of students at a plurality of student stations;
   performing a microsurgical eye operation on a operational eye model by a student at a student station;
   taking video pictures with a video camera of the operation through a microscope;
   transmitting said pictures to a video screen viewable by a teacher at a teacher station; and
   establishing an audio communication with a microphone and speakers with the teacher and students respectively.

2. A method according to claim 1 and including the steps,
   providing
   (g) a multiple monitor, and
   performing a student operation on the corresponding operation model and projecting it on the monitor in position for a teacher at the teacher station to observe.

3. A method according to claim 2 and including the steps,
   providing,
   (h) a video recorder, and
   recording video pictures from the video cameras at the student stations on the video recorder, and
   reproducing the video pictures from the video recorder on the multiple monitor.

4. A method according to claim 1 and including the step,
   providing,
   (i) a monitor capable of being reversible to re-play a previously performed operation by a student, and so re-playing it.

5. A method according to claim 4 and including the step,
   displaying an operation performed by a teacher selectively on the video or the multiple monitor.

6. A method according to claim 4 and including the step,
   providing a monitor capable of simultaneously displaying the video pictures from the video cameras at all of the student stations on the multiple monitor.

7. A method according to claim 1 and including the steps,
   providing a second video camera at each student station viewing the corresponding operation from a direction different from that of the first mentioned video camera and that is inaccessible to the student, and
   showing the pictures from those cameras selectively on the multiple monitor.

8. A method according to claim 3 and including the steps,
   providing,
   (j) a computer and storing therein measurement signals derived from operations at the student stations.

* * * * *